United States Patent [19]

Sasaki et al.

[11] Patent Number: 4,531,762
[45] Date of Patent: Jul. 30, 1985

[54] VEHICULAR SEAT BELT DEVICE

[75] Inventors: Kiichi Sasaki; Tateo Kawade; Seiichiro Nemoto, all of Saitama, Japan

[73] Assignee: Honda Giken Kogyo Kabushiki Kaisha, Tokyo, Japan

[21] Appl. No.: 424,888

[22] Filed: Sep. 27, 1982

[30] Foreign Application Priority Data

Sep. 25, 1981 [JP] Japan .................. 56-151775
Sep. 28, 1981 [JP] Japan .................. 56-153135

[51] Int. Cl.$^3$ .............................................. B60R 21/10
[52] U.S. Cl. ...................................... 280/801; 280/808
[58] Field of Search .......................... 280/801, 804, 808

[56] References Cited

U.S. PATENT DOCUMENTS 4,222,588  9/1980  Suzuki et al. ................ 280/804
4,231,592  11/1980  Scherenberg et al. ........... 280/808
4,317,584  3/1982  Takata ....................... 280/804

FOREIGN PATENT DOCUMENTS 2552862  6/1976  Fed. Rep. of Germany ...... 280/804
2814302  3/1979  Fed. Rep. of Germany ...... 280/808
2416019  8/1979  France ........................ 280/804

Primary Examiner—Joseph F. Peters, Jr.
Assistant Examiner—Ross Weaver
Attorney, Agent, or Firm—Lyon & Lyon

[57] ABSTRACT

A three-way seat belt device for use in a vehicle body employs a seat belt having one end secured within a retractor fixed to the vehicle body, the belt passing upward from the retractor through an elevated guide ring and then downward so that the other end of the belt extends to a lower part of the interior of the vehicle body to a slider guided for longitudinal movement relative to a stationary guide member. The guide member may take the form of a guide channel or a guide bar. Power means for moving the slider longitudinally along the guide member may comprise an electric motor driving through a reduction gear or may comprise apparatus for moving the slider responsive to movement of a door of the vehicle.

6 Claims, 21 Drawing Figures

VEHICULAR SEAT BELT DEVICE

BACKGROUND OF THE INVENTION

This invention relates to a vehicular seat belt device and more particularly to an improvement of a vehicular three-way type seat belt device.

In a vehicular three-way seat belt device, a seat belt is positioned on one side behind the seat, and therefore when a passenger is to put on the belt, he is required to twist his body and reach for the belt because he must reach some distance for the belt, and this is inconvenient. Particularly in the case of a large door as in a two-door vehicle, a side pillar at a rear part of the door on which the seat belt is vertically mounted results in an even larger distance from the belt and is even more inconvenient for a passenger to put on the belt.

To avoid such inconvenience, it may be effective to dispose the seat belt forwardly of the pillar, but this arrangement is inconvenient for a rear seat passenger to get on and off the vehicle and to load and unload goods.

Various improvements have heretofore been proposed to remedy the above-mentioned drawbacks. In Japanese Utility Model Laid Open No. 52-121020, for example, a belt guide arm is caused to stand up obliquely to an operative position in interlock with rising and falling motion of a front seat back.

The belt guide arm is brought down rearwardly to an inoperative position and held in place horizontally below the door. But this belt guide arm stands up obliquely on a side of the seat when loading the belt and projects in the door opening beside the passenger, thus giving a projecting impression, which is not considered good in point of appearance. In Japanese Patent Publication No. 57-24599, a seat belt is moved back and forth along a side of the roof panel in interlock with rising and falling motion of a front seat back, but since the belt is positioned vertically at an intermediate or front portion of the door opening in a fallen condition of the seat back, this is not considered best for a rear seat passenger to get on and off the vehicle and to load and unload goods. In Japanese Utility Model Laid Open No. 53-56624 a seat belt retaining hook is attached to a shoulder portion of the seat back to retain a seat belt, thereby permitting a passenger to reach for the belt at the seat back shoulder portion when putting on the belt. But in a two-door vehicle, since the seat back is tilted forward when a rear seat passenger gets on and off the vehicle, it is necessary for the belt to be engaged and disengaged with respect to the seat back on all such occasions, and thus the operation is troublesome.

The present invention is intended to overcome the above-mentioned disadvantages of the conventional three-point type seat belt and those of the aforesaid conventional means proposed to remedy such disadvantages.

SUMMARY OF THE INVENTION

According to the present invention, a vehicular three-way type seat belt device has one end of a seat belt connected to a retractor mounted on a side portion of a vehicle body, and the belt extends upward from the retractor and then down through a turn-around guide member mounted on an upper part of the side portion of the vehicle body. The belt is conducted downward, and the other end thereof is connected to a lower part of the side portion of the vehicle body. A portion of the belt is retainable for loading the belt by an engaging mechanism mounted centrally in the vehicle width on the vehicle body. There is provided an improvement in that the lower connecting portion of the belt is moved automatically in the longitudinal direction of the vehicle body while being guided by a substantially horizontal, linear guide member. The guide member extends in the longitudinal direction of the vehicle body near an inside side sill provided at the lower side of a door opening portion.

It is an object of the present invention to provide a vehicular three-way type seat belt wherein one end of a seat belt is connected deliverably and windably to a retractor mounted on a side portion of a vehicle body, and the belt extends upward from the retractor to a turn-around guide member mounted on an upper part of the side portion of the vehicle body. The belt is turned up and conducted downward, and the other end thereof is connected to a lower part of the side portion of the vehicle body. A portion of the belt is retained for loading of the belt by an engaging mechanism mounted centrally in the vehicle width on the vehicle body, and which seat belt device is easy to put on, and when not in use, offers convenience for getting on and off the vehicle and loading and unloading of goods, and further does not project into the door opening.

Preferred embodiments of the present invention will be described in detail hereinunder with reference to the accompanying drawings, from which further features, objects and advantages of the invention will become apparent.

DETAILED DESCRIPTION OF PREFERRED EMBODIMENTS

Figure 1:
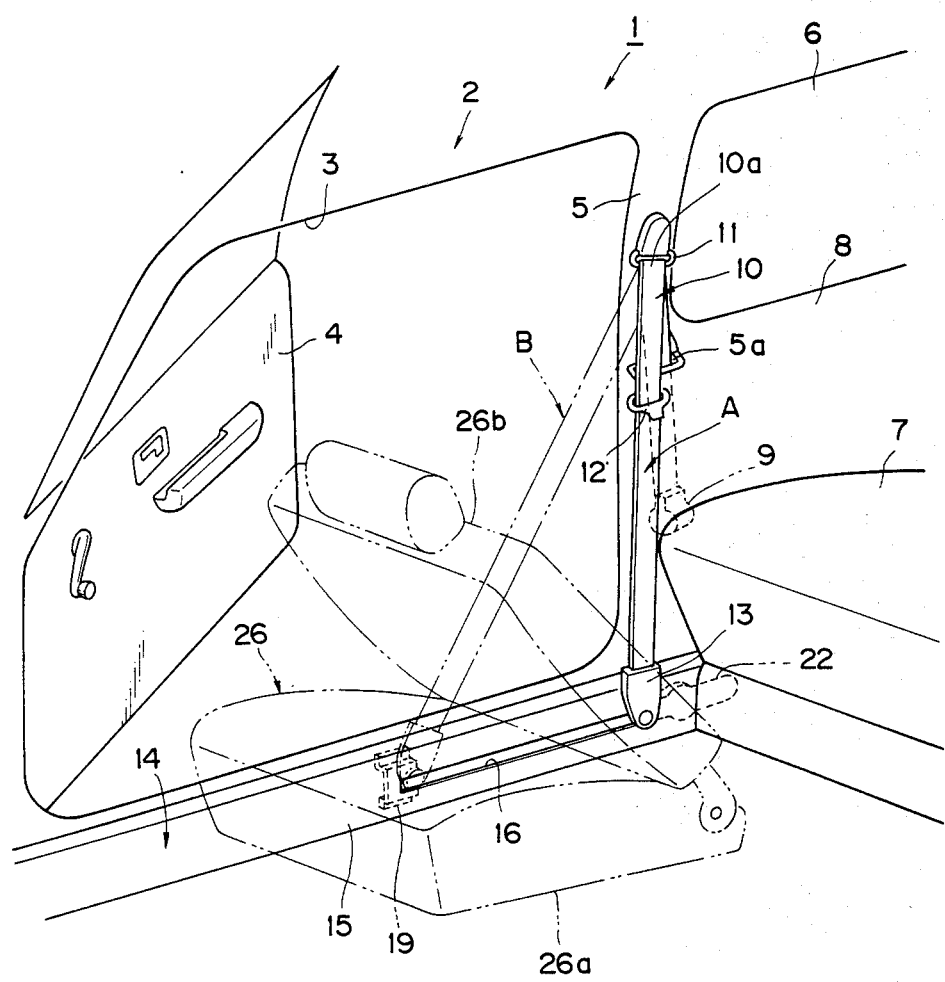
FIG. 1 is an explanatory perspective view illustrating a preferred embodiment of the present invention.
Figure 2:
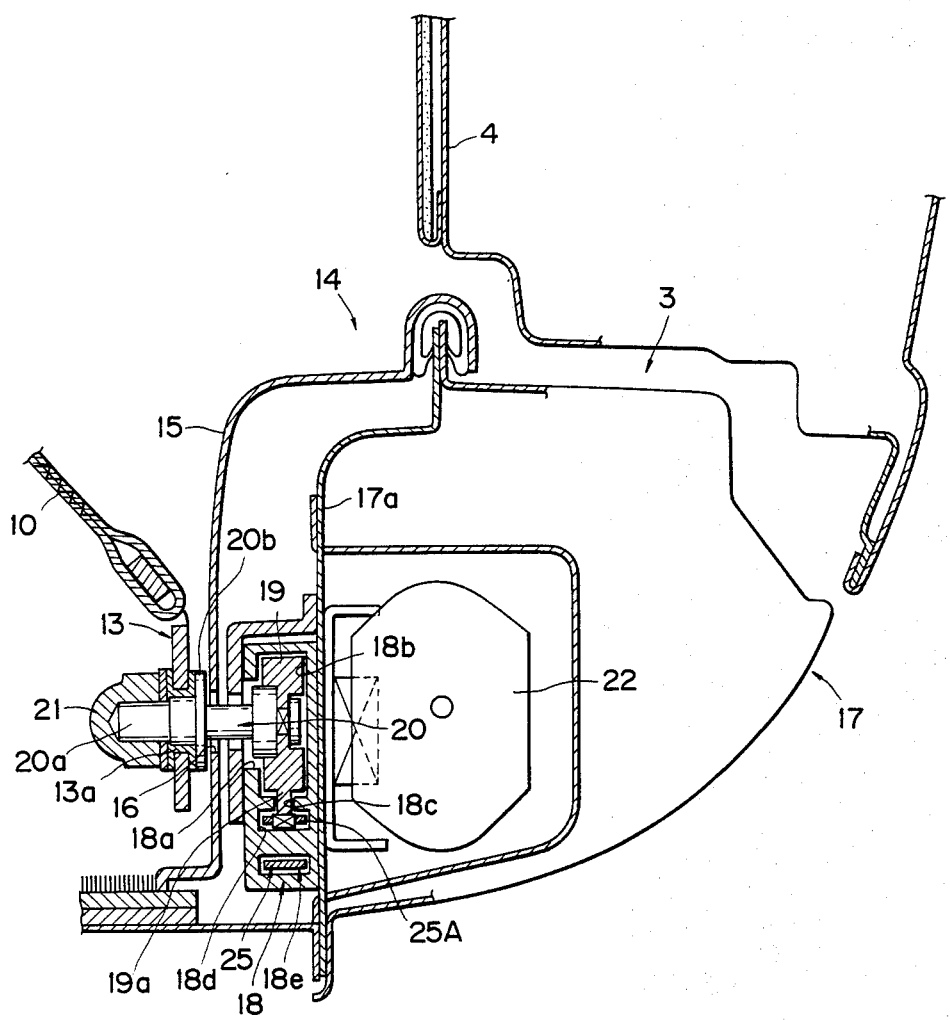
FIG. 2 is an enlarged longitudinally sectional front view of a side sill portion.
Figure 3:
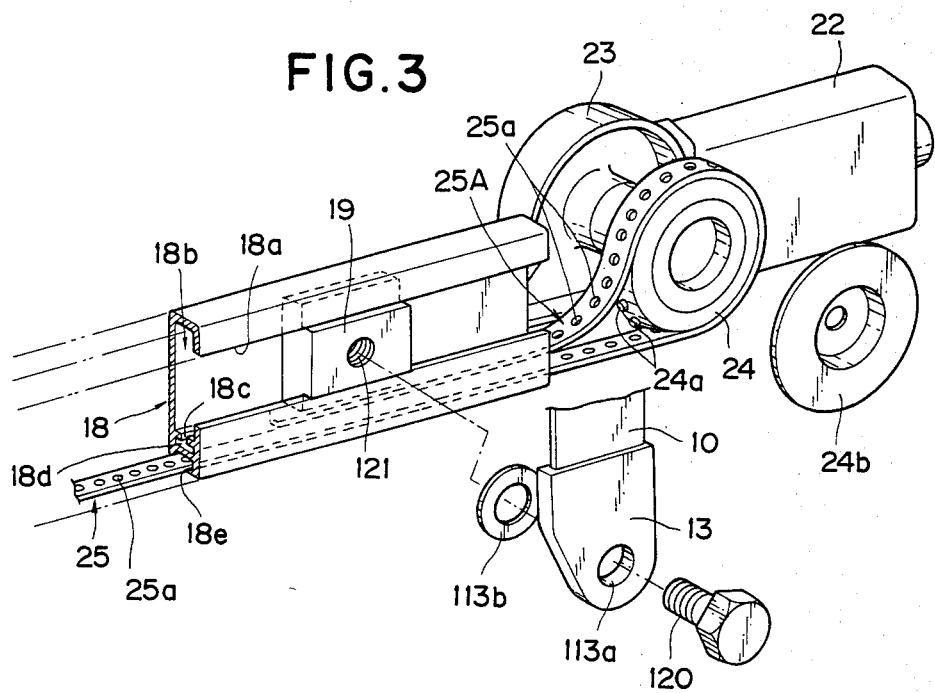
FIG. 3 is a perspective view of drive means including a modification.

Referring first to FIGS. 1 through 3, the reference numeral 1 represents the entirety of a vehicle, and as shown in FIG. 1, a door 4 is mounted for opening and closing motion in a door frame 3 of a vehicle body 2 of the vehicle 1, and behind the door frame 3 is mounted a pillar portion 5. Furthermore, behind the pillar portion 5 is provided a window 6, and a rear seat 7 is mounted within the vehicle room. In a lower part of the pillar portion 5 is mounted a retractor 9 between a vehicle room lining 8 and an outer side panel (not shown). One end of a single seat belt 10 is wound into the retractor 9. The seat belt 10 is drawn out from an outlet port 5a formed in an upper position of the lower half part of the pillar portion 5 to the inside of the pillar portion, that is, to the inside of the vehicle room, then turned down by a pivotable guide ring 11 mounted in a suitable position on an intermediate or upper part of the pillar portion 5 and brought down along the pillar portion 5. The lower end of the belt 10 is fixed to an anchor 13 mounted in a rear position of the lower side of the door frame 3. A tongue plate 12 is slidably mounted in a position between the said lower end and a turnaround area 10a of the seat belt 10.

As shown in FIG. 2, a side sill 14 provided at a lower-side portion of the door frame 3 is disposed in a longitudinal direction, and a guide slot 16 of a predetermined length is formed longitudinally in an inner panel 15 of the side sill 14. A longitudinally extending guide rail 18 is fixed to the inside surface 17a of a side sill body 17 having a box-like section positioned at the outside of the inner panel 15. The guide rail 18 is provided with a channel 18b having an opening 18a which opens toward the inside of the vehicle room. Below the channel 18b is formed a longitudinally extending upper tape guide passage 18d which communicates with the bottom portion of the channel 18 through an upward communicating portion 18c. Below the upper tape guide passage 18d is formed a longitudinally extending lower tape guide passage 18e partitioned from the passage 18d. Slidable within the channel 18b of the guide rail 18 is a slider 19 from which there inwardly projects a rod-like arm 20 through the guide slot 16 of the inner panel 15. The anchor 13 for fixing the lower end of the seat belt 10 is fixed to the projecting end of the arm 20 by means of a cap nut 21. More specifically, the arm 20 is provided near its tip end with an externally threaded portion 20a with which the nut 21 is threadedly engaged, and a flanged collar 13a with the anchor 13 fitted thereon is mounted on the portion between the nut 21 and a flange 20b formed on the base of the threaded portion 20a of the arm 20.

As illustrated as a modification in FIG. 3, the anchor 13 for the belt 10 may be slidably secured to the slider 19 by forming a threaded hole 121 in the slider 19 and inserting a bolt 120 into a mounting hole 113a formed in the belt anchor 13 through a washer 113b until it comes into threaded engagement with the threaded hole 121.

Behind the guide rail 18 is mounted a motor 22 which is accommodated in the interior of the side sill 14. A pulley 24 as a sprocket member, which extends from a reduction gear 23 of the motor 22 in parallel with the rail 18, is provided on its outer periphery with plural projections 24a radially at equal intervals. A single tape 25 having plural apertures 25a at equal intervals passes through the upper and lower passages 18d and 18e. The tape 25 is disposed above and below in parallel by the passages 18d and 18e. More specifically, the portion of the tape 25 drawn out from the end portion of the rail 18 is wound around the pulley 24, and the apertures 25a of the tape 25 are engaged with the projections 24a of the pulley 24. The tape 25 is allowed to slide back and forth within the passages 18d and 18e through the pulley 24 by forward and reverse drive of the motor 22. A downward depending connection 19a of the slider 19 is inserted in the communicating portion 18c formed in the bottom of the channel 18b and is engaged with a portion 25A of the tape 25 which faces the upper passage 18d. When the upper portion 25A of the tape 25 slides upon forward or reverse drive of the motor 22, the slider 19 moves forward or backward while being guided by the rail 18, so that the belt anchor 13 is moved in the same direction. The reference numeral 24b shown in the figure designates a flange for preventing the tape from coming off, the flange 24b being attached to an end face of the pulley 24.

Within the vehicle room inside the door frame 3 is mounted a front seat 26 as shown in FIG. 1. The front seat 26 comprises a seat cushion 26a and a seat back 26b. One side of the seat cushion 26a faces the side of the inner panel 15 of the side sill 14. The position of the seat cushion 26a is adjustable back and forth along a guide rail (not shown), and the seat back 26b is a rise and fall type capable of being pivoted back and forth. In a forward-inclined position of the seat back 26b, a passenger is allowed to get in or out of the vehicle, and loading or unloading of goods, if any, may be accomplished.

In case the seat back 26b of the seat 26 is brought down forward with the seat belt not in use and the door 4 is open, namely, a condition leading to a passenger's getting on or off the rear seat 7, or the loading or unloading of goods, has been detected, the motor 23 is reverse-driven by means of one of several switches. For example, a door open/close detecting switch, a seat cushion taking/leaving detection switch, or a seat back forward-inclined state detecting switch, may cause movement of the anchor 13 back to the lower rear part of the door frame 3 behind the seat cushion 26a through action of the slider 19. The seat belt 10 then faces the rear inside of the door frame while its upper portion is supported by the pillar portion 5 and thus extends downward. As a result, the seat belt 10 is hidden behind the door frame 3, as shown in solid line A in FIG. 1, so it is not an obstacle to a passenger getting on or off the vehicle or loading or unloading of goods.

When a passenger sits on the seat cushion 26a of the front seat 26, this condition is detected, for example, by a switch mounted in the interior or other part of the seat cushion 26a, and the closing of the door 4 is detected by a switch mounted in the frame 3 of the door 4 or a switch attached to a hinge portion for opening and closing the door, thereby causing the motor 22 to turn in a direction to move the anchor 13 forward, from its rearmost position by means of the rail 18 and the slider 19. The anchor 13 is moved up to the rear portion of the seat cushion 26a. In this case, the limit of its forward movement is detected, for example, by a switch attached to the rail 18, and the motor 22 is stopped so that the anchor 13 is positioned opposite to the rear portion of the seat cushion 26a. At this time, the anchor 13 for the lower end of the seat belt 10 comes into close contact, from inside the vehicle room, with the inner side of the side sill inner panel 15. Therefore, unlike the conventional arm, it does not project into the vehicle room. Moreover, as shown in phantom lines B in FIG. 1, the belt 10 obliquely faces the door frame 3, thus permitting the passenger to grasp the three-point type seat belt 10 consisting of a single belt easily in a seated posture and put on it. In the above-mentioned operation, the anchor 13 may be held normally in a front position and moved backward when opening the door 4, or it may be held normally in a rear position and moved forward as necessary when using the belt.

Figure 4:
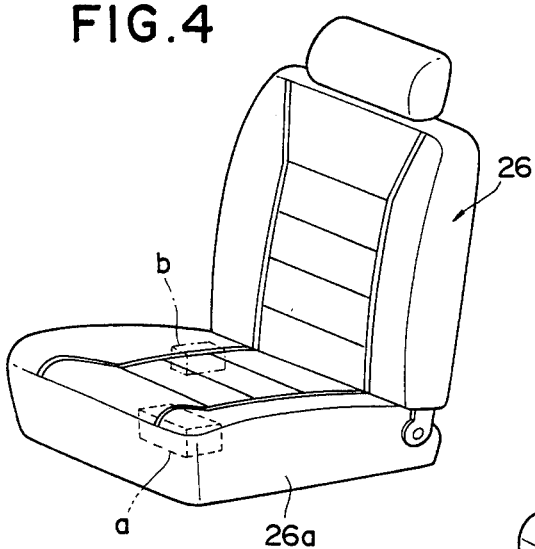
FIGS. 4 through 10 are diagrams illustrating examples of arrangement of detection switches.
Figure 5:
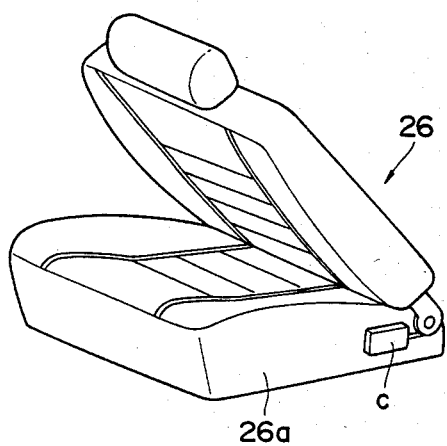
Figure 6:
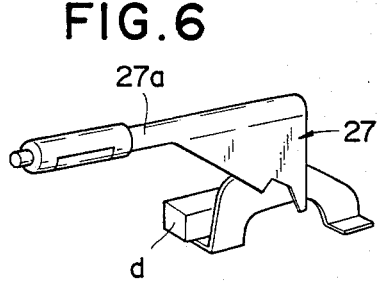
Figure 7:
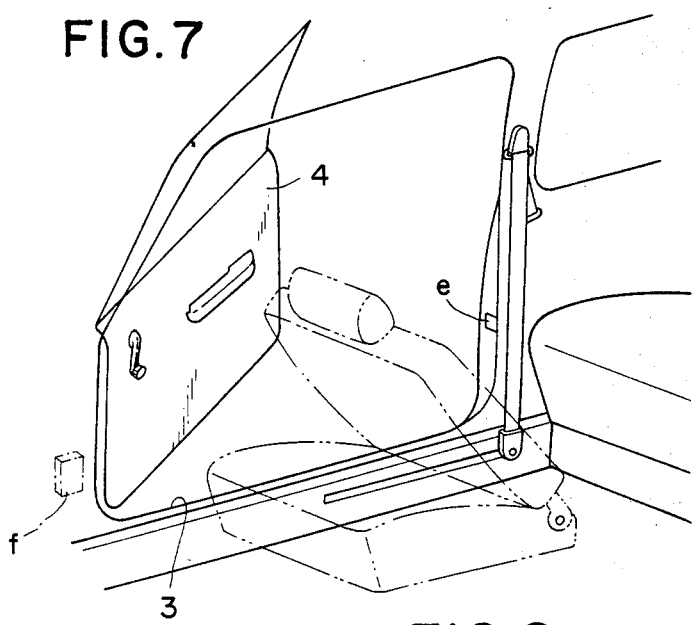
Figure 8:
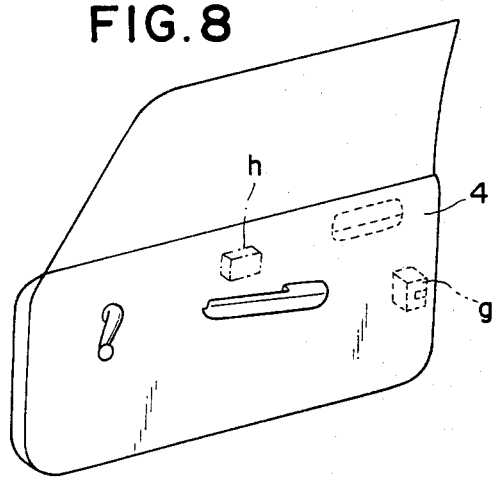

Referring now to FIGS. 4 through 10, there are shown examples of arrangement of controlling detection switches for forward- and reverse-driving and stopping the motor 22 described above. In FIG. 4, a pressure detecting switch a or b is mounted in a suitable position in the interior of the seat cushion 26a of the seat 26. In FIG. 5, a switch c for detecting a forward falling motion of the seat back 26b is attached to a side of the seat cushion 26a of the seat 26. Further, in FIG. 6, a switch d is provided for detecting operation of an operating lever 27a for a parking brake 27, thereby detecting a raised-up state of the operating lever 27a to detect non-use of the belt 10, and also detecting a lowered state thereof to detect use of the belt 10. In FIG. 7, a door open/close detecting switch e is attached to the rear side of the frame 3 of the door 4, or a switch f is mounted in front of the door frame 3 to detect opening and closing of the door 4. Further, in FIG. 8, an open/close detecting switch g is attached to a rear part of the door 4, or a switch h is mounted near the handle for opening and closing the door, to detect opening and closing of the door 4.

Figure 9:
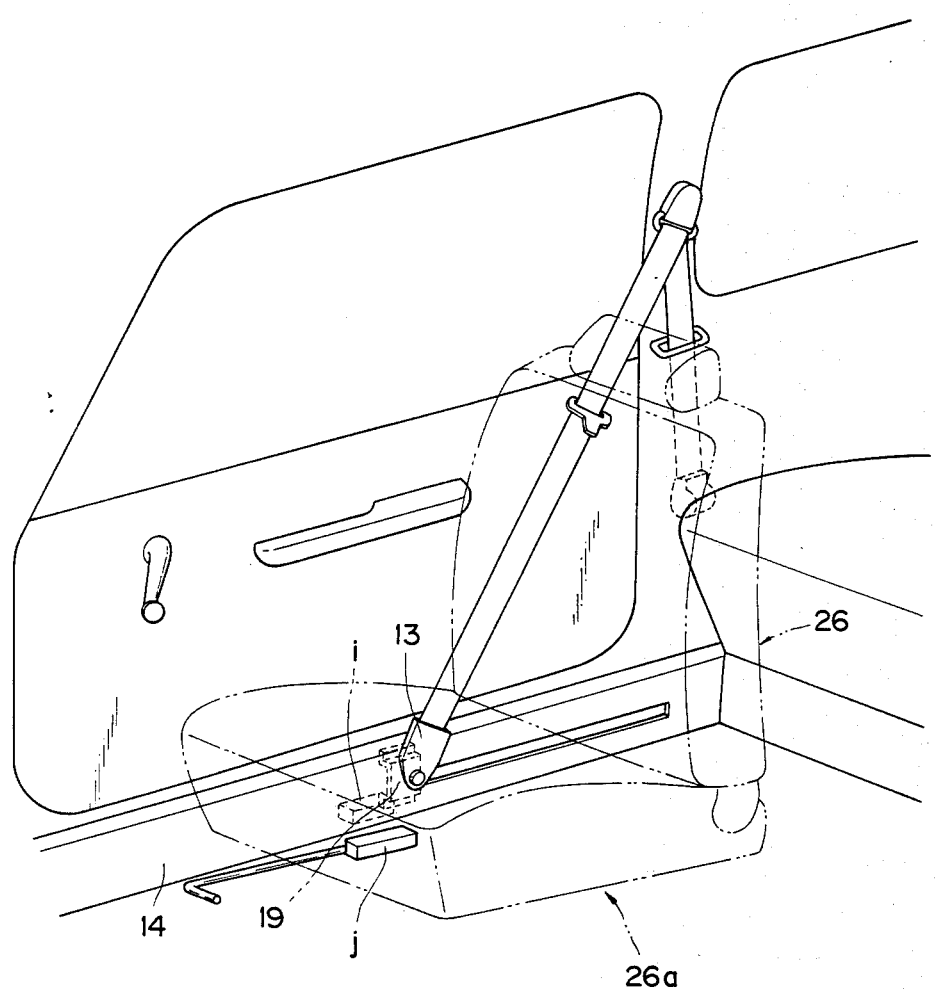

FIG. 9 illustrates a switch i for detecting a limit of forward movement of the belt anchor 13. The switch i, which is mounted in a suitable position of the side sill 14, is capable of detecting the advance limit of the belt anchor 13 upon contact with the slider 19. In adjusting the longitudinal position of the seat cushion 26a of the seat 26, a switch is attached to the seat cushion 26a and it is moved back and forth together with the seat cushion 26a, whereby the advance limit of the slider 19 or the belt anchor 13 is adjustable to a position best suited for putting on the seat belt 10 in relation to the seat 26.

Figure 10:
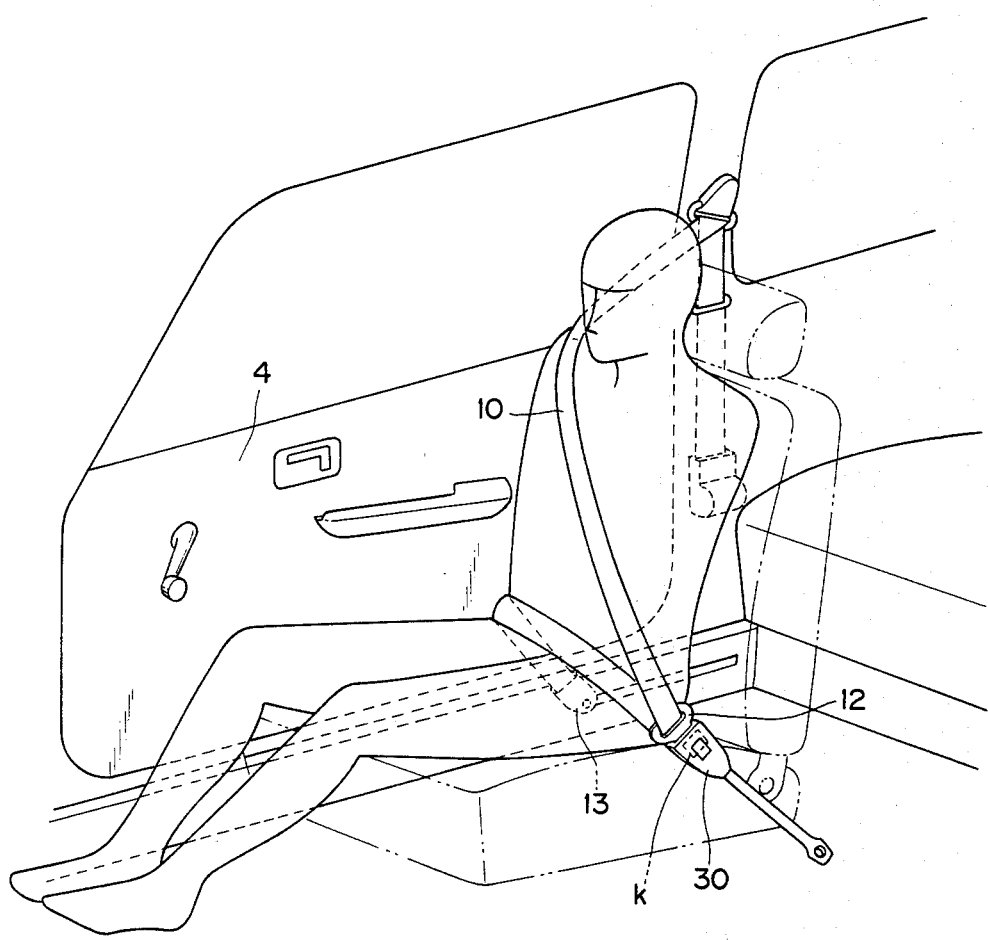

FIG. 10 illustrates a retaining mechanism for the seat belt 10, wherein a switch k is mounted within a buckle 30, and the moment at which the tongue plate 12 attached to the seat belt was inserted and retained in the buckle 30 is detected by the switch k, thereby allowing the anchor 13 now occupying its front position to move backward. More particularly, upon operation of both the switch k and a closing detection switch for the door 4, the belt anchor 13 is moved backward.

The above-mentioned switches may be selectively combined each in single or plural numbers for performing the operations described above.

Figure 11:
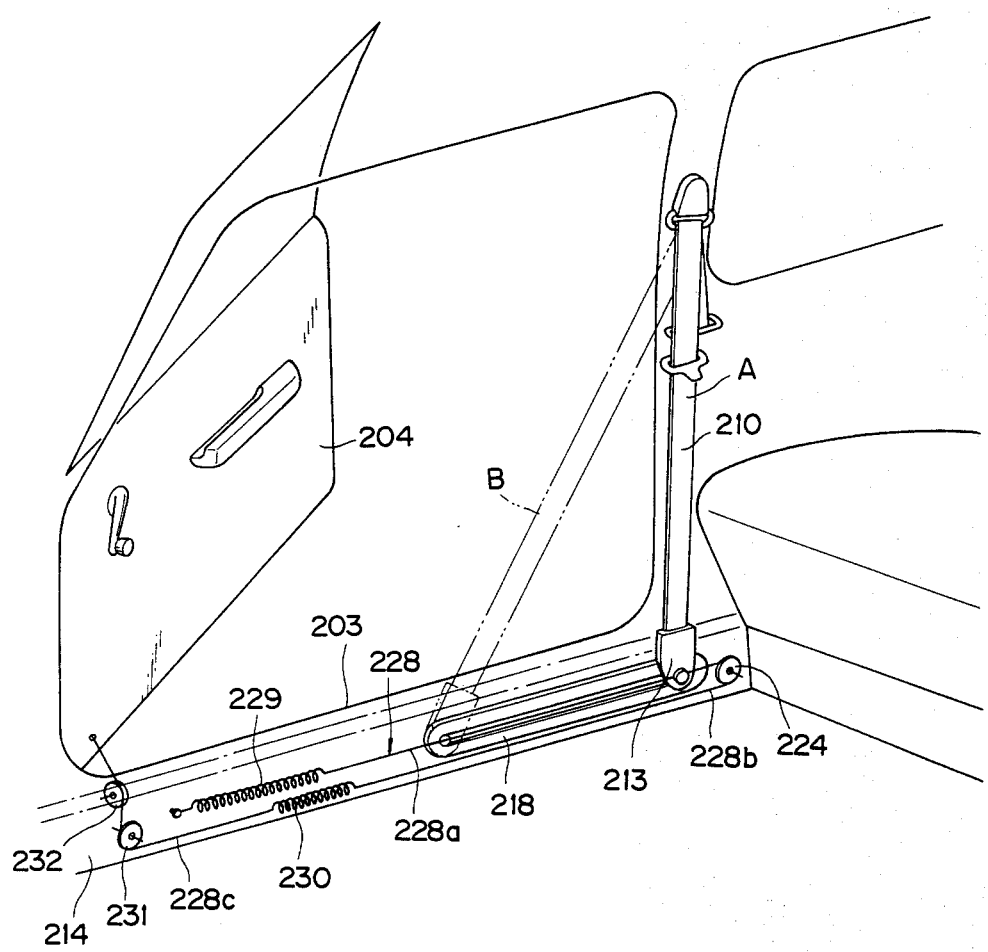
FIG. 11 is a view similar to FIG. 1, illustrating a second embodiment of the present invention.
Figure 12:
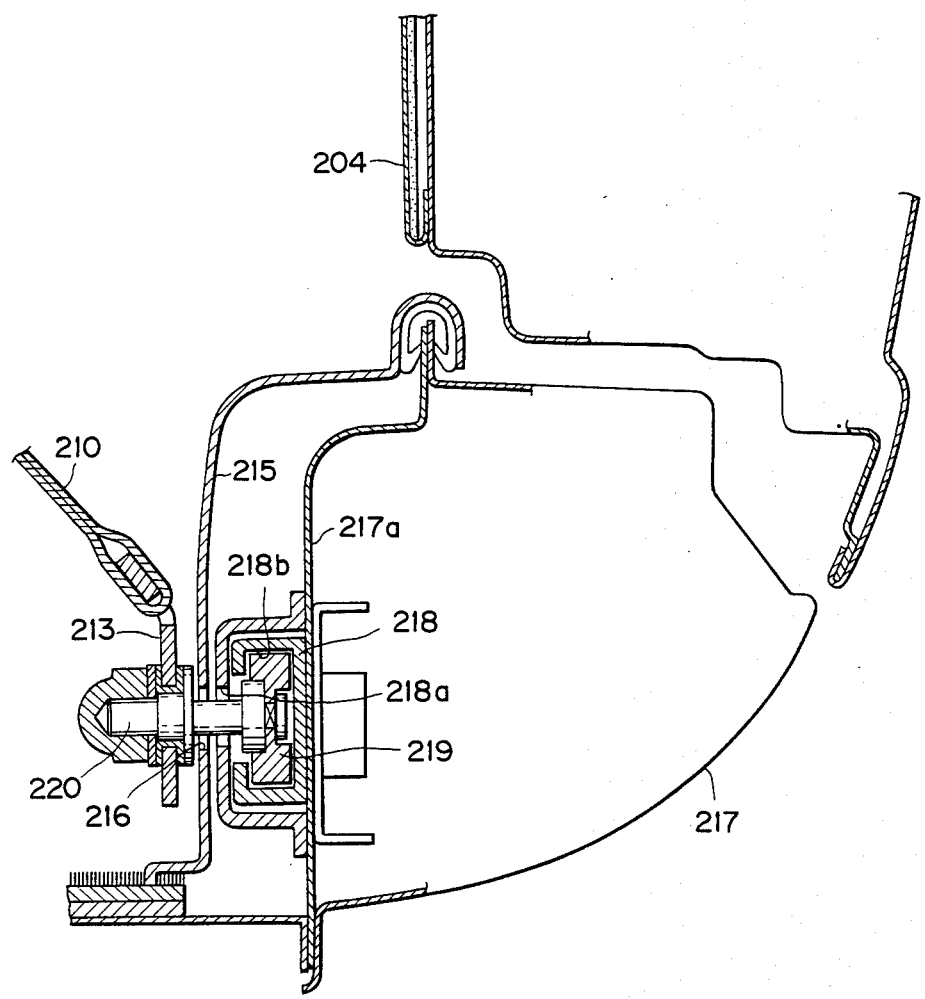
FIG. 12 is a view similar to FIG. 2, showing the device of FIG. 11.

Referring now to FIGS. 11 and 12, there is shown another embodiment of the present invention, wherein, instead of using the motor 22, a mechanism adapted to operate in coordination with the opening and closing motion of a door 204 fulfills the driving function. More specifically, a longitudinally extending guide rail 218 is attached to the inner surface 217a of a side sill body 217 within a side sill inner panel 215, as shown in FIG. 12. The rail 218 is provided with a channel 218b having a longitudinal slot 218a which opens toward the interior of the vehicle room. Fitted in the channel 218b is a slider 219 to which is fixed an arm 220. The arm 220 projects into the vehicle room through a longitudinal slot 216 formed in the inner panel 215, and like the first embodiment, an anchor 213 which supports the lower end of a belt 210 is pivotally secured to the tip portion of the arm 220.

The slider 219 is connected to a wire 228 as shown in FIG. 11. The wire 228, which is disposed in the interior of a side sill 214, extends from the front to the rear, is connected intermediately to the slider 219, then further extends to the rear until it passes halfway around a guide pulley 224 disposed behind the rear end of the rail 218, and then extends downward and forward. An upper portion 228a of the wire 228 connected to the slider 219 is connected to a coil spring 229 which is connected at one end thereof to the front portion of the side sill 214, while a lower portion 228b of the wire 228 is connected to the rear end of another coil spring 230. The front end of the coil spring 230 is connected to a wire 228c which passes around guide pulleys 231 and 232 which are secured to the front portion of the side sill 214 so that their axial directions meet at right angles with each other. The wire 228c is then connected to the front portion of the door 204.

In the above arrangement, the biasing force of the spring 229 is set stronger than that of the spring 230 to normally pull the anchor 213 up to the front end of the rail 218, so that in a closed state of the door 204 the lower end of the belt 210 is in its most advanced position facing the rear portion of the front seat, as shown in phantom lines B in FIG. 11. When the door 204 is opened, the wire 228c is pulled while being guided by the pulleys 232 and 231, thus causing the spring load of the spring 230 to increase to the extent that it overcomes the spring 229, so that the wire 228b is pulled, and this pulling force is transmitted to the wire 228a through the pulley 224. As a result, the slider 219 moves backward along the rail 218, that is, the anchor 213 moves backward until it reaches its rearmost position within the rail 218, as shown in solid lines A in FIG. 11, and it is hidden behind an opening portion 203. This position of the parts is suitable for a passenger getting on or off the vehicle, or loading or unloading of goods. Furthermore, when the door 204 is closed, the pulling force for the spring 230 is relieved, so the spring 229 is pulled by the wire 228a and moves up to the most advanced position.

Figure 13:
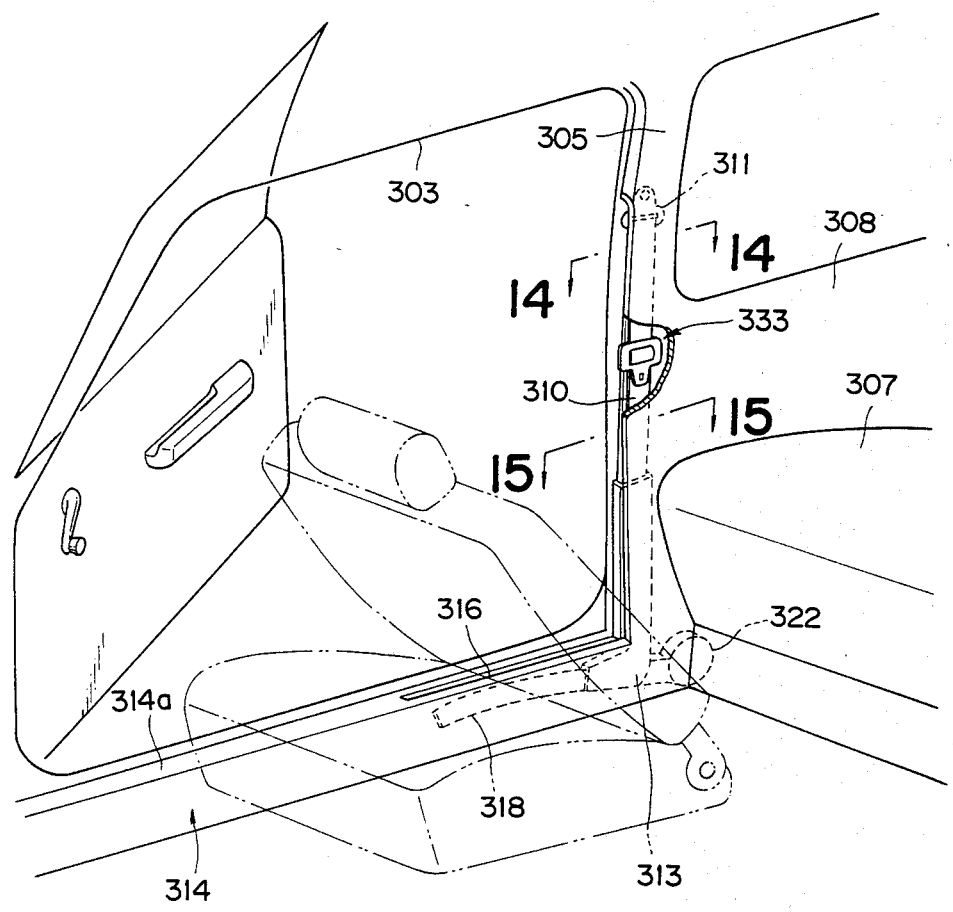
FIG. 13 is a view similar to FIG. 1, illustrating a third embodiment of the present invention.
Figure 14:
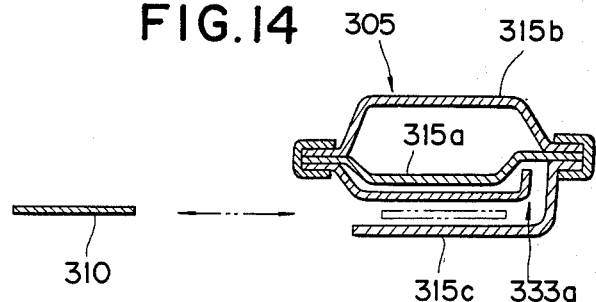
FIGS. 14 and 15 are sectional views taken on lines 14—14 and 15—15 of FIG. 13, respectively.
Figure 15:
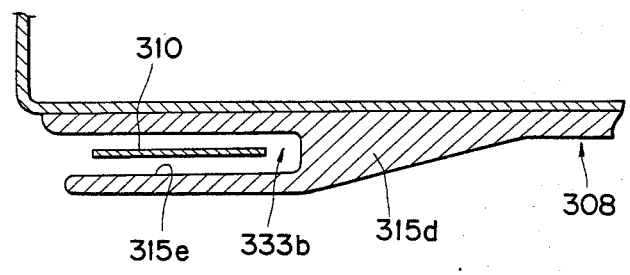

Referring now to FIGS. 13 through 15, there is illustrated another embodiment of the present invention, wherein a guide rail 318 is disposed longitudinally within a side sill 314 which is provided at the lower-side portion of a door frame 303. A longitudinally extending slot 316 is formed in an upper surface 314a of the side sill 314. The slot 316 is connected to the lower portion of a belt accommodating gap 333 which is formed vertically in the rear side part of the opening portion 303 and which is opened toward the front. Slidably engaged with the rail 318 is a holder anchor 313 which holds the lower end of a seat belt 310, the seat belt 310 being turned down through a guide ring 311 and connected at one end thereof to a retractor (not shown). The anchor 313 is moved back and forth along the rail 318 by operation of a motor 322 and performs the same operation as in the foregoing embodiments.

According to this embodiment, in the rearmost position of the anchor 313, the belt 310 is accommodated, together with the guide ring 311 and belt anchor 313, within the gap 333 formed in the rear side of the door frame 303 and therefore it is not exposed to the side of the rear seat 307. Consequently, a passenger's leg never touches the lower portion of the belt 310, nor does an umbrella or the like touch it, and therefore the belt 310 is not stained. Furthermore, the loading and unloading of goods or the action of a passenger getting on and off the vehicle can be done without touching the belt 310. When the belt 310 is to be used, it is drawn out of the gap 333 and is allowed to move forward through the slot 316.

A pillar portion 305 positioned on the window side of the rear seat 307 comprises a combined body of inner and outer plates 315a and 315b as shown in FIG. 14. A lining member 315c is mounted inside the inner plate 315a so that it opens toward the front, the rear end of the member 315c being closed, thereby forming an upper portion 333a of the gap 333. In the lower part of the pillar portion 305, as shown in FIG. 15, a front portion 315d of the lining member 308 is thick-walled, and in this thick-walled front portion 315d is formed from front to rear a recess 315e which is deeper than the width of the belt 310. The recess 315e includes a lower portion 333b of the belt accommodating gap 333. Such a gap may be formed by providing a recessed portion in part of the vehicle body which constitutes the rear side of the opening portion 3.

Although the above-described embodiments are for two-door vehicles, the present invention is applicable also to four-door and other vehicles.

Figure 16:
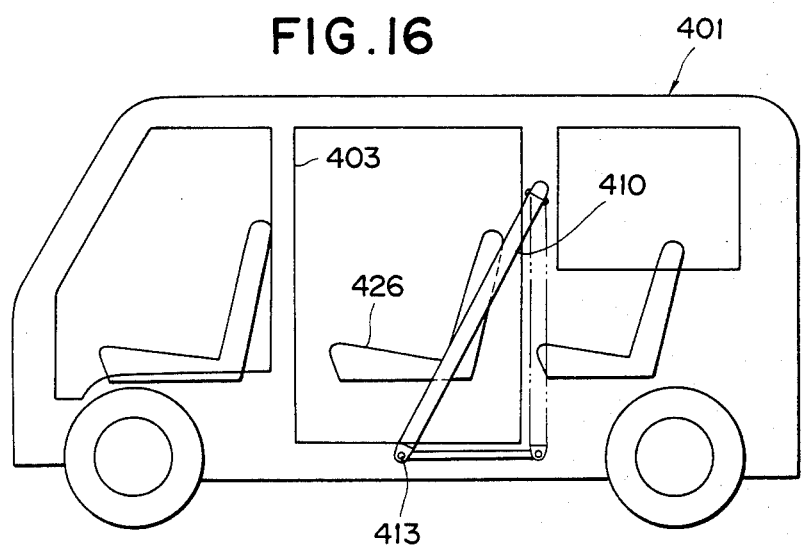
FIG. 16 illustrates an example of application to a van type vehicle according to a fourth embodiment of the present invention.

Referring to FIG. 16, a vehicle 401 is provided intermediately with a door frame 403 in which is fitted a sliding door (not shown), and in the rear side part of the opening portion 403 a belt 410 is accommodated in a substantially upright position. By moving an anchor 413 back and forth, the seat belt 410 is allowed to perform the same operation as in the foregoing embodiments with respect to an intermediate seat 426.

Figure 17:
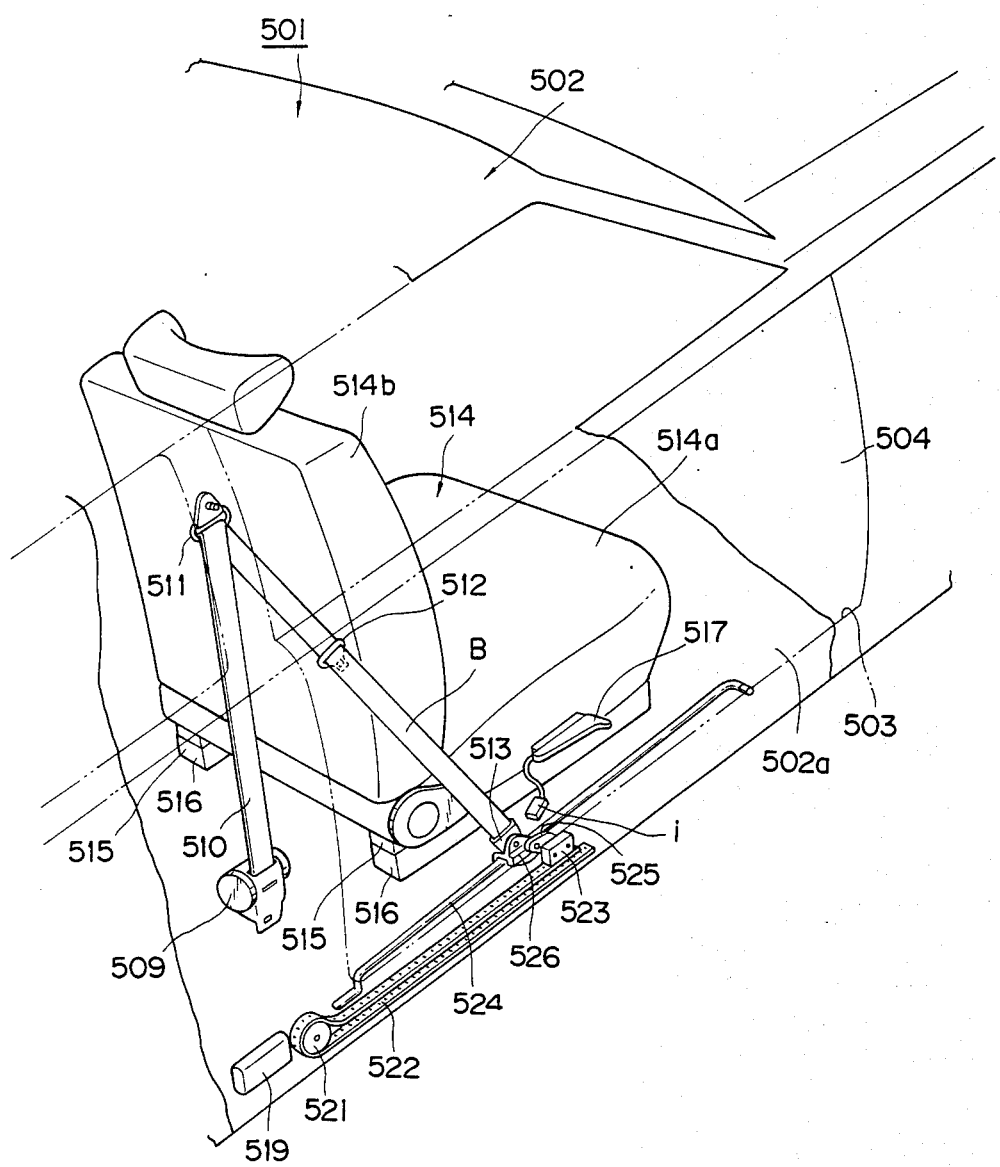
FIG. 17 is an explanatory perspective view of principal portions according to a fifth embodiment of the present invention, seen through from outside of the vehicle.
Figure 18:
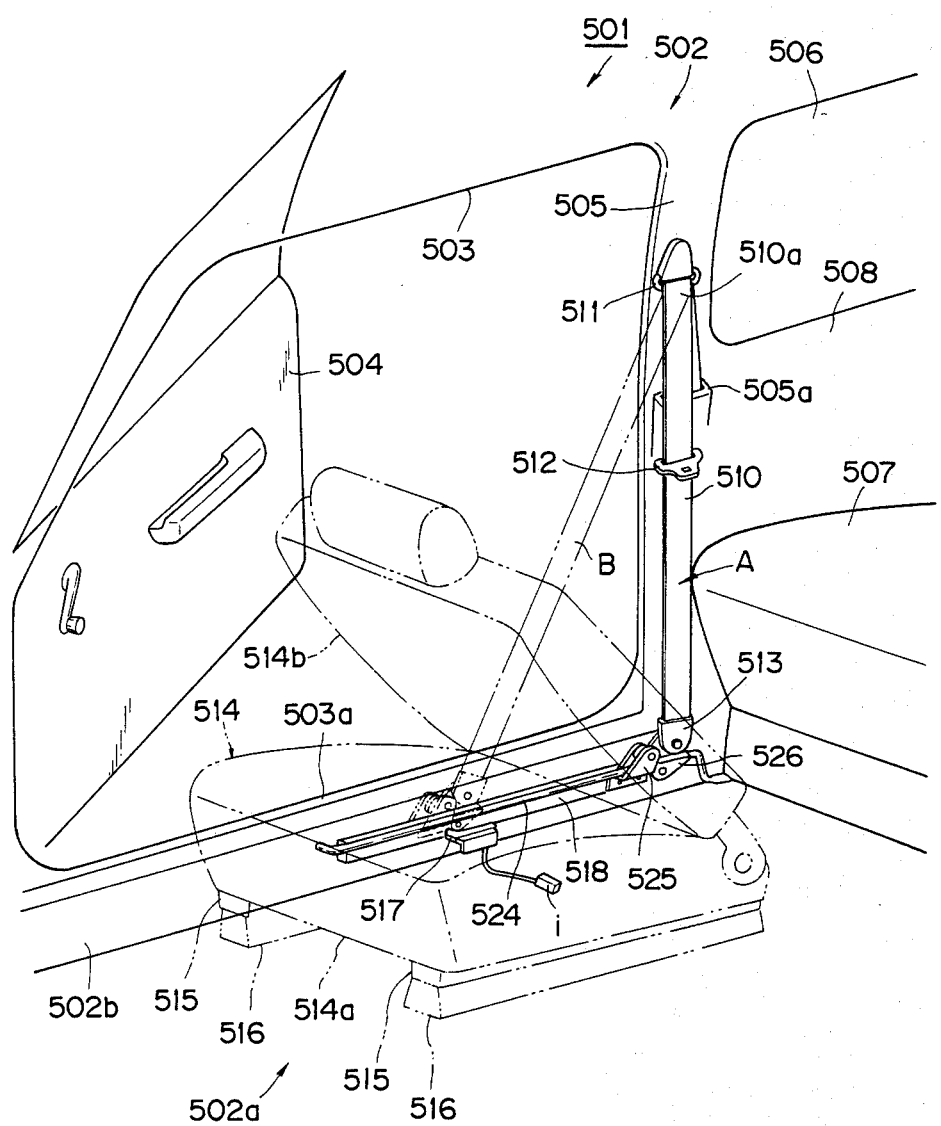
FIG. 18 is also a perspective view of the device of FIG. 17 but from the inside of tte vehicular room.
Figure 19:
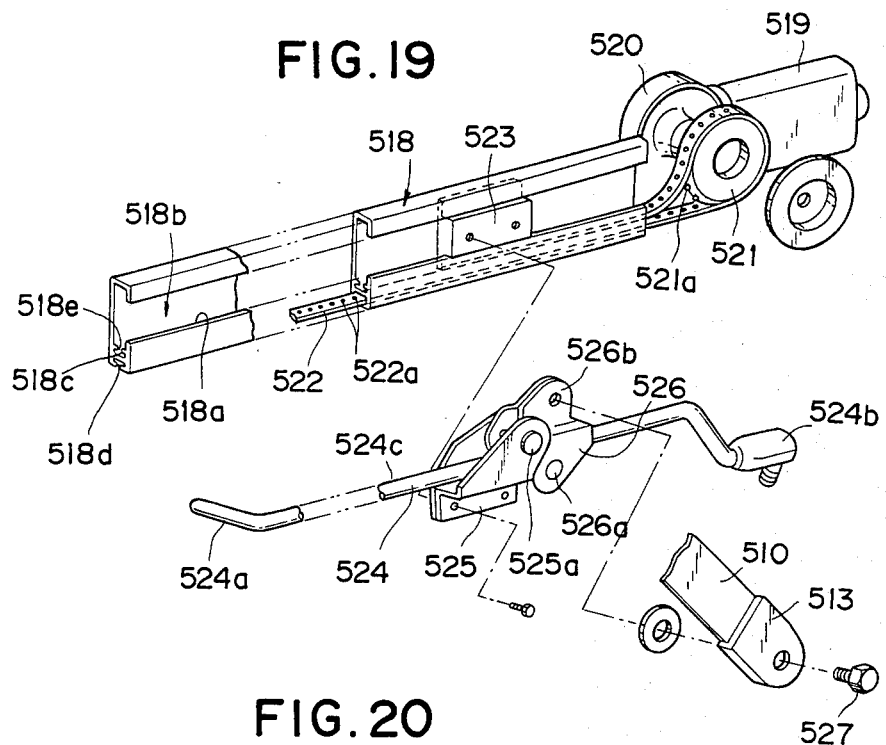
FIG. 19 is an exploded perspective view of a drive guide mechanism.

Referring to the form of the invention shown in FIGS. 17 through 21, the explanatory perspective view of FIG. 17 shows a vehicle as seen from the outside; the view is partly broken away to show a seat belt device according to another embodiment of the present invention; FIG. 18 is also a perspective view thereof but seen from the inside of the vehicle room; and FIG. 19 is an exploded perspective view of apparatus for guiding the movement of an anchor for the lower part of a seat belt. Although a two-door vehicle is shown in this embodiment, the seat belt device is applicable also to four-door and other vehicles.

In a door frame 503 of a body 502 of a vehicle 501 is mounted a door 504 capable of being opened and closed, and behind the door frame 503 is provided a pillar portion 505. Furthermore, behind the pillar portion 505 is provided a window 516, and a rear seat 507 is mounted within the vehicle room. In a lower part of the pillar portion 505 a retractor 509 is accommodated between an inside lining 508 and an outside side panel (not shown), and one end of a single seat belt 510 is wound around the retractor 509. The other end of the belt 510 is drawn out from an outlet port 505a formed in a lower part of the pillar portion 505, then turned down through a pivotable guide ring 511. The belt 510 then extends downward along the pillar portion 505 and is fixed to an anchor 513 disposed behind a lower side 503a of the door frame 503. A tongue plate 512 is slidably fitted around the seat belt 510 in a position below a turn-around point 510a of the belt 510.

A front seat 514 is disposed on both sides in front of the rear seat 507 within the vehicle room, and it faces the inside of the door frame 503. The seat 514 comprises a seat cushion 514a and a seat back 514b. The seat back is mounted upright on the rear end of the seat cushion 514a so that it can be brought down and raised up adjustably in its inclination angle. Movable rails 515 are fixed to right and left sides of the underside of the seat cushion 514a and are brought into slidable engagement with longitudinally extending fixed rails 516 which are mounted right and left on a floor 502a, whereby the seat cushion 514a is made adjustable in its longitudinal position. This adjustment is performed by a handle 517 which is fixed to a lower part of a side of the seat cushion 514a facing the door frame 503.

Within a side sill 502b which is provided at the intervehicular lower inside portion below the lower side 503a of the door frame 503, or on its intra-vehicular side outer surface, there is mounted a rectilinear, channel-like rail 518 which is substantially horizontal in a longitudinal direction. The rail 518, which serves as a first guide member, has a slot 518a which is open toward the inside of the vehicle room, an interior channel portion 518b, and longitudinally extending upper and lower guide passages 518c and 518d which are formed below the channel portion 518b. The upper passage 518c communicates with the lower part of the channel portion 518b through a notch 518e. The rail 518 has a portion extending from behind the door frame 503 and below the pillar portion 505 up to a front position corresponding to the side front portion of the seat cushion 514a. Behind the rail 518 is mounted a motor 519. The motor 519 has a sprocket-like driving pulley 521 which extends from a reduction gear 520 and which is provided on its outer periphery with a large number of equally spaced projections 521a. A tape 522 having longitudinal equally spaced apertures 522a is inserted into the upper and lower passages 518c and 518d. The tape 522 is drawn out in the form of a loop from the rear ends of those passages and extends around the pulley 521. The projections 521a engage the apertures 522a so that the tape 522 is moved within the passages by forward and reverse driving of the motor. A slider 523 is slidably fitted in the channel portion 518b. On the intra-vehicular side outer surface of the side sill 502b and in a position beyond the rail 518 toward the inside of the vehicle room there is mounted a longitudinal, substantially horizontal, rectilinear guide bar 524 in parallel with the rail 518, the guide bar 524 serving as a second guide member.

A front portion 524a of the guide bar 524 is bent outward, namely, to the side sill side, and is fixed to the latter. Its rear portion 524b is bent downward and fixed onto the floor or other portion behind and below the lower side 503a of the opening portion. A first holder 525 to be secured to the slider 523 is engaged with the guide bar 524 in such a manner that it holds the guide bar 524 from below. Furthermore, a second holder 526 is pivoted to the first holder 525 by means of a pin 525a and it is engaged with the guide bar 524 in such a manner that it holds the guide bar 524 from above. The second holder 526 is provided at its lower portion with a pin 526a which crosses below the guide bar 524. The pins 525a and 526a extend over and below the guide bar 524, respectively, in a somewhat biased manner in the longitudinal direction. Consequently, the load of the seat belt 510 applied to the second holder 526 is transmitted to the guide bar 524, which is engaged by the pins 525a and 526a, thus allowing also the vehicle body side to bear such load. A rectilinear portion 524c of the guide bar 524 is somewhat longer than the longitudinally moving distance of the belt lower end fixing portion, and the holders 525 and 526 slide in the longitudinal direction along the rectilinear portion 524c upon movement of the slider 523 and the tape 522. The anchor 513 at the lower end portion of the seat belt 510 is pivoted with a bolt or the like to an upward projecting bracket 526b of the second holder 526. Consequently, the lower-end anchor 513 of the seat belt 510 moves back and forth at the side portion of the side sill 502b while being guided by the guide bar 524 and rail 518.

FIG. 17 shows the position of the parts when the seat belt anchor 513 has been moved to the front, while FIG. 18 shows the position of the parts when the anchor 513 has been moved to the rear.

The seat belt 510 while not in use, as shown in FIG. 18, is positioned behind the lower side 503a of the door frame at a lower part of the pillar portion 505 in a vertical position, and therefore it does not become an obstacle to the passenger on the rear seat 507 when he gets on or off the vehicle, or an obstacle to the loading or unloading of goods. This condition is indicated at A in FIGS. 18 and 20.

Figure 20:
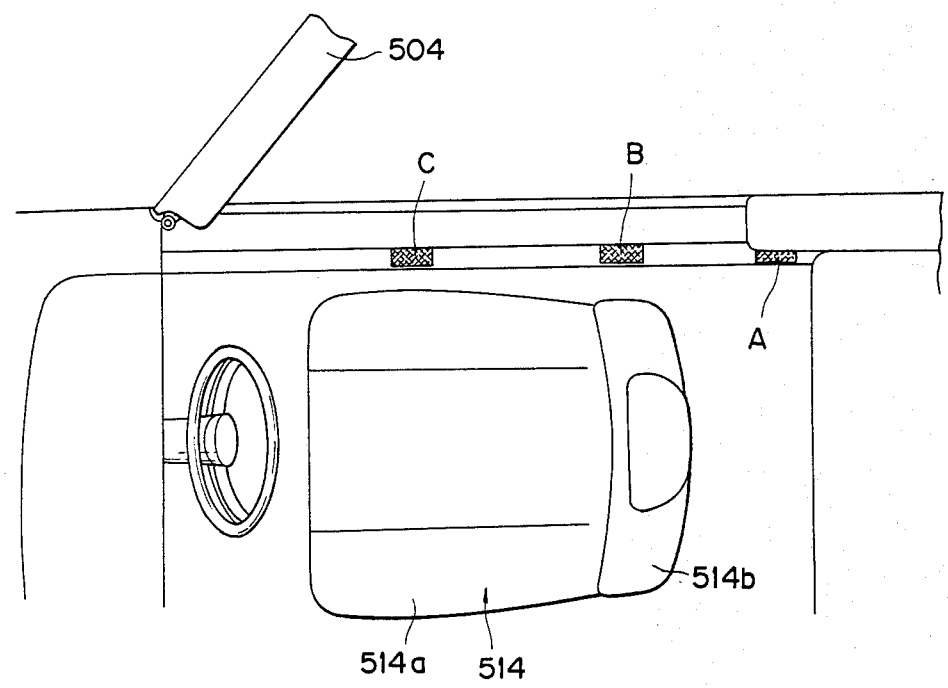
FIG. 20 is an explanatory plan view illustrating a positional relationship between a seat and a belt anchor.

When the seat belt 510 is to be used, the belt anchor 513 advances from the position A up to the side of the rear end portion of the seat cushion 514a and stops there, now ready for use, as indicated at B in FIGS. 18 and 20. That is, the portion of the seat belt 510 extending from the guide ring 511 now occupies a rear side position closer to the passenger, thus permitting the passenger to easily grasp the belt 510 and put it on.

Figure 21:
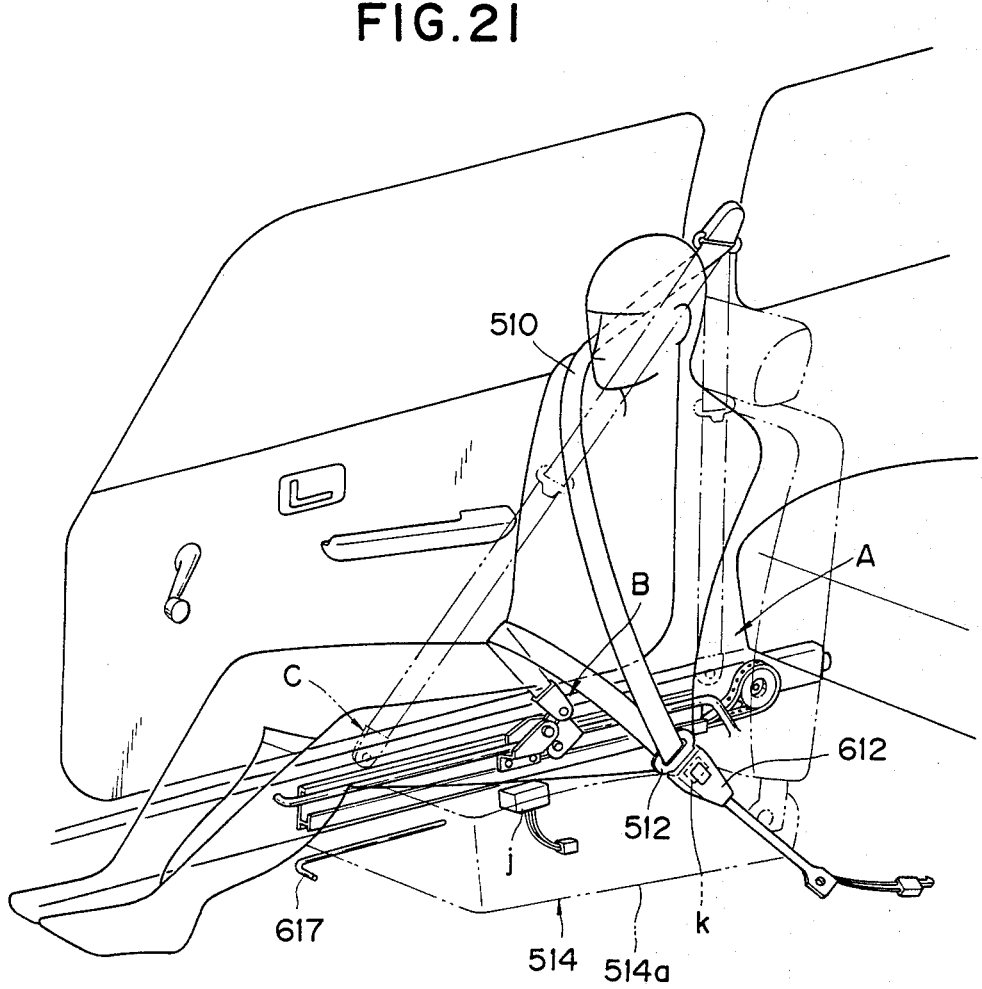
FIG. 21 illustrates a positional relationship including a modification.

As is apparent from FIGS. 18 and 19, the seat cushion 514a is provided with a position detecting switch i. The switch i is operated by the holders 525 and 526 which move the belt anchor 513 forward. Upon contact of the holders 525 and 526 or pushers or the like attached thereto with the switch i, the motor 519 is turned off to stop the forward movement of the belt 510. In case the seat cushion 514a was adjusted in its position forward or backward by a handle 517 as shown in FIGS. 18 and 19, or by an operating bar 617 as shown in FIG. 21, the belt anchor 513 for the lower end of the seat belt 510 can be stopped at an ideal anchoring point of the seat belt 510 in accordance with such adjusted forward or backward position. That is, the seat changes in its rear end side position back and forth along with its longitudinal movement, so the position of the anchor belt in its state of use is adjusted in the longitudinal direction in conformity with such longitudinal movement of the seat.

FIG. 21 is an explanatory diagram of a partial modification, wherein a longitudinally adjusting handle 617 for the seat cushion 514a projects forward at a lower portion of the seat cushion 514a, and a switch j is attached thereto to attain the same mode of operation as above.

As to the movement of the belt anchor 513 for moving the belt from its rearmost position A, when the belt is to be used, the belt anchor 513 advances beyond the loading position B up to an intermediate or front side position C (shown in FIGS. 20 and 21), and then moves back and stops at the regular loading position B opposite to the rear end side of the seat cushion 514a. This condition is shown in solid lines in FIG. 21. Thus, the belt anchor 513 is once moved up to its foremost position and then moved back to the rear end side of the seat 514 for loading the belt. As a result, it becomes easier to grasp the belt 510 and to perform its loading operation. The backward movement from the foremost position to the regular loading position is effected by means of a switch k for detecting engagement of the tongue plate 512 with an engaging unit 612, or a switch mounted on an instrument panel (not shown). The stopping in the regular position may be effected by detection with the switch i. Also in this case, only point B or points A and B are adjusted back and forth by the above switch in interlock with the longitudinal adjustment of the seat.

Having fully described our invention, it is to be understood that we are not to be limited to the details herein set forth but that our invention is of the full scope of the appended claims.

We claim:

1. In a three-way type seat belt device for a vehicle body having a door and a seat in which one end of a seat belt is secured within a retractor secured to the vehicle body, the belt passing upward from the retractor to an elevated guide ring and then downward so that the other end thereof extends to a lower part of the interior of the vehicle body, a device mounted on the vehicle centrally of the width thereof, and latch means for detachably securing an intermediate portion of the belt to said device, the improvement comprising, in combination: an inside side sill provided at the lower side of a door frame on the vehicle body, a stationary guide member extending longitudinally near the inside side sill, a slider movable along said guide member, means connecting the other end of said belt to said slider, and means for moving the slider forward and rearward in response to changes in the positions of the door and seat.

2. The combination set forth in claim 1 in which said slider moving means includes an electric motor driving through a reduction gear for moving said slider in both directions.

3. The combination set forth in claim 1 in which a flexible tension element is provided and connected to the door for moving the slider.

4. In a three-way type seat belt device for a vehicle body having a door and a seat in which one end of a seat belt is secured within a retractor secured to the vehicle body, the belt passing upward from the retractor to an elevated guide ring and then conducted downward so that the other end thereof extends to a lower part of the interior of the vehicle body, a device mounted on the vehicle centrally of the width thereof, and latch means for detachably securing an intermediate portion of the belt to said device, the improvement comprising, in combination: an inside side sill provided at the lower side of a door frame on the vehicle body, a substantially horizontal, statinary guide channel mounted longitudinally near the inside side sill, a slider guided for longitudinal movement in said guide channel, means connecting the outer end of said belt to said slider, and means for moving the slider forward and rearward in response to changes in the positions of the door and seat.

5. The combination set forth in claim 4 in which a stationary guide passage is positioned parallel to side guide channel, and in which a flexible tape is received for longitudinal movement therein and connected to said slider, and said slider moving means includes an electric motor and reduction gear means to connect to the flexible tape to move said slider.

6. In a three-way type seat belt device for a vehicle body having a longitudinally adjustable seat, a seat belt having one end secured within a retractor secured to the vehicle body, the belt passing upward from the retractor to an elevated guide ring and then conducted downward so that the other end thereof extends to a lower part of the interior of the vehicle body adjacent the seat, a device mounted on the vehicle centrally of the width thereof, and latch means for detachably securing an intermediate portion of the belt to said device, the improvement comprising, in combination: an inside side sill provided at the lower side of a door frame on the vehicle body, a substantially horizontal stationary guide member mounted longitudinally near the inside side sill, a slider guided for longitudinal movement relative to said guide member, means connecting the other end of said belt to said slider, and means responsive to movement of said seat for causing operation of an electric motor to move said slider forward and rearward relative to said guide member.

* * * * *